United States Patent
Avrahami et al.

(10) Patent No.: US 9,721,098 B2
(45) Date of Patent: Aug. 1, 2017

(54) NORMALIZING AND DETECTING INSERTED MALICIOUS CODE

(71) Applicant: International Business Machines Corporation, Armonk, NY (US)

(72) Inventors: Ela Avrahami, Tel Aviv (IL); Ziv Eli, Tel Aviv (IL); Daniel Moore, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 92 days.

(21) Appl. No.: 14/722,270

(22) Filed: May 27, 2015

(65) Prior Publication Data
US 2016/0173507 A1   Jun. 16, 2016

Related U.S. Application Data

(63) Continuation of application No. 14/568,193, filed on Dec. 12, 2014.

(51) Int. Cl.
| | |
|---|---|
| G06F 21/56 | (2013.01) |
| H04L 29/06 | (2006.01) |
| G06F 21/51 | (2013.01) |

(52) U.S. Cl.
CPC ........... *G06F 21/563* (2013.01); *G06F 21/51* (2013.01); *G06F 21/564* (2013.01); *H04L 63/145* (2013.01); *H04L 63/1416* (2013.01)

(58) Field of Classification Search
CPC .. G06F 21/563; G06F 2221/033; G06F 21/51; G06F 21/564; H04L 63/145; H04L 63/1416
See application file for complete search history.

(56) References Cited

U.S. PATENT DOCUMENTS

| | | | | |
|---|---|---|---|---|
| 7,802,303 | B1* | 9/2010 | Zhao | G06F 21/564 |
| | | | | 370/230 |
| 8,838,992 | B1* | 9/2014 | Zhu | G06F 21/56 |
| | | | | 713/164 |
| 2007/0240217 | A1* | 10/2007 | Tuvell | G06F 21/56 |
| | | | | 726/24 |
| 2008/0016339 | A1* | 1/2008 | Shukla | G06F 21/53 |
| | | | | 713/164 |

(Continued)

*Primary Examiner* — Theodore C Parsons
*Assistant Examiner* — Thomas Ho
(74) *Attorney, Agent, or Firm* — Garg Law Firm, PLLC; Rakesh Garg; Jeffrey S. LaBaw

(57) ABSTRACT

A method, system, and computer program product for detecting malicious code insertion in data are provided in the illustrative embodiments. At an application executing using a processor and a memory in a data processing system, a script that has been inserted in a mix of code and content is detected. A content-related portion is removed from the script to form a remaining script structure, the content-related portion referring to the content in the mix. From the remaining script structure, a code construct is selected and replaced with an alphanumeric string to form a normalized construct. Whether the normalized construct matches, within a tolerance, a second normalized construct in a corpus of normalized scripts is determined. Responsive to the normalized construct matching the second normalized construct within the tolerance, a conclusion is drawn that the script is malicious.

10 Claims, 6 Drawing Sheets

(56) References Cited

U.S. PATENT DOCUMENTS

2010/0011441 A1\* 1/2010 Christodorescu ....... G06F 21/53
   726/24
2010/0281540 A1\* 11/2010 Alme .................... G06F 21/563
   726/23

\* cited by examiner

NORMALIZING AND DETECTING INSERTED MALICIOUS CODE

TECHNICAL FIELD

The present invention relates generally to a method for detecting malware. More particularly, the present invention relates to a method for normalizing and detecting inserted malicious code.

BACKGROUND

Modern methods of information exchange use a complex mix of code and content. For example, a significant amount of data is exchanged by requesting content or information from web servers or other servers configured to deliver information over a data network, and receiving the information in a browser or other similarly usable application. For the clarity of the description, a web server is used as an example of a server supplying the mix of content and code, and a browser is used as an example of an application that receives such a mix.

Often, the server supplies the requested information with code. The browser uses the code to arrange or present the information, manipulate or modify the information, validate or secure the information, or perform some computation relative to the information.

Any number of servers or server applications can supply the requested information. Similarly, the code portion of the code-content mix received at a browser can come from any number of servers. Furthermore, the code can take any of the many possible forms that are suitable for this purpose. A script is code written in a scripting language. Like other types of code, scripts can be embedded in the data received into a browser.

It is not uncommon for scripts to be inserted in a data exchange between a browser and a server. Often, such script insertion has a malicious intention, which can range from minor to major breaches. For example, some malicious scripts are inserted in the data reaching a browser to present advertisements and offers to the user of the browser. Some other scripts are inserted to track a user's activities on the browser. Still other scripts are inserted to collect sensitive information such as passwords or account numbers. Scripts capable of violating an organization's data security to steal large amounts of financial data, sensitive information, or to perform corporate espionage are also known to exist.

Presently, software such as antivirus tools, anti-malware applications, browser safety add-ons, ad blockers, and server blacklists are available to deal with the ever increasing epidemic of malicious code. These presently available technologies essentially match portions of suspect code against lists of previously seen suspect code fragments known as signatures. If the portion of the suspect code matches a signature, the presently available solutions flag the code as malicious. If a code is inserted by a known malicious source, such as a server on a blacklist, the presently available solutions flag the code as malicious. Presently available solutions also prevent the code that is flagged as malicious from executing.

SUMMARY

The illustrative embodiments provide a method for normalizing and detecting inserted malicious code. An embodiment includes a method for detecting malicious code insertion in data. The embodiment detects, at an application executing using a processor and a memory in a data processing system, a script that has been inserted in a mix of code and content. The embodiment removes, to form a remaining script structure, from the script a content-related portion, the content-related portion referring to the content in the mix. The embodiment selects, from the remaining script structure, a code construct. The embodiment replaces, to form a normalized construct, the code construct with an alphanumeric string. The embodiment determines whether the normalized construct matches, within a tolerance, a second normalized construct in a corpus of normalized scripts. The embodiment concludes, responsive to the normalized construct matching the second normalized construct within the tolerance, that the script is malicious.

Another embodiment includes a computer usable program product comprising a computer readable storage device including computer usable code for detecting malicious code insertion in data.

Another embodiment includes a data processing system for detecting malicious code insertion in data.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
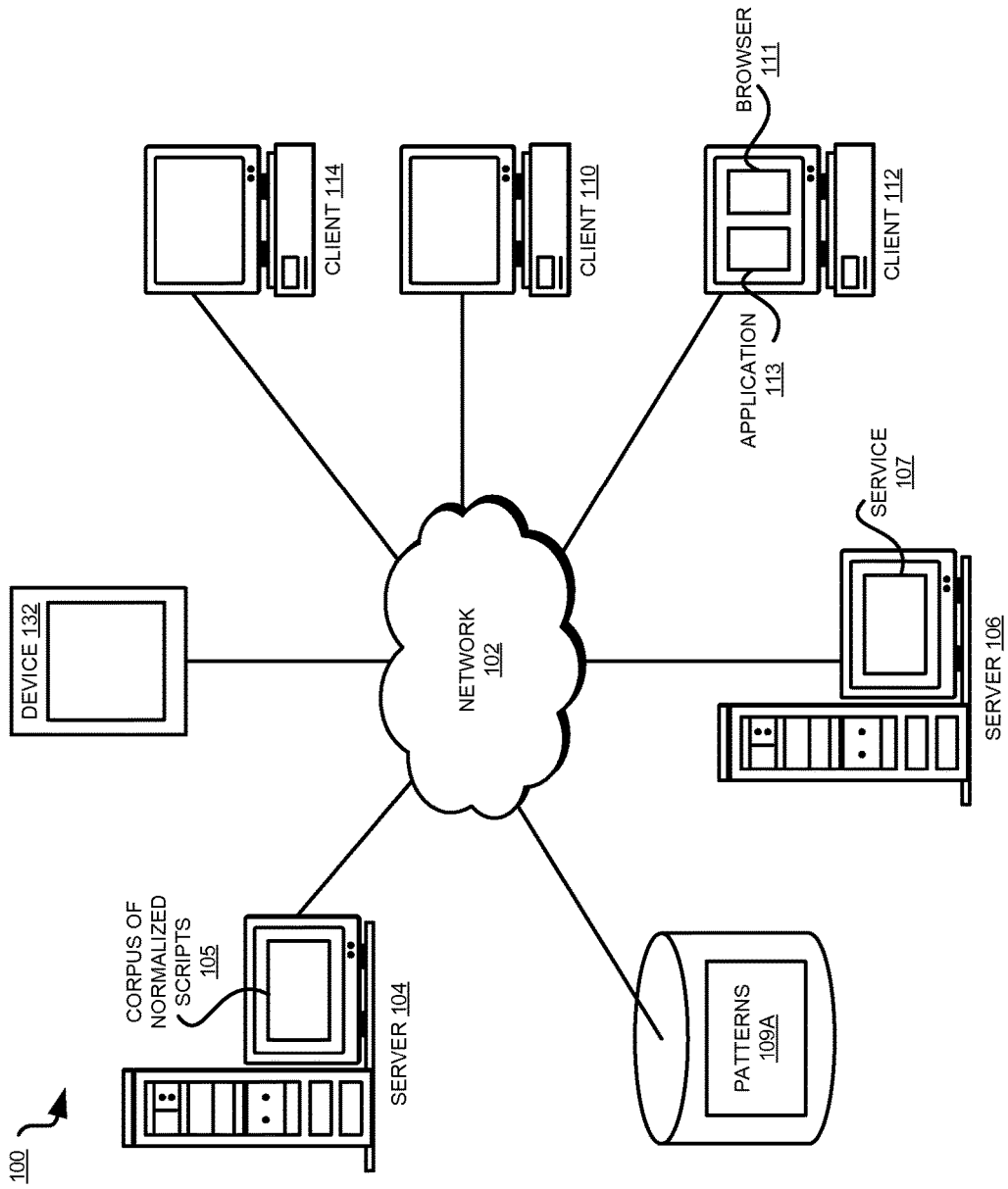
FIG. 1 depicts a block diagram of a network of data processing systems in which illustrative embodiments may be implemented.

The illustrative embodiments recognize that presently available solutions for detecting malicious code in a browser's data are limited in their detection capabilities because of the manner in which they perform the detection. For example, unless a researcher or software expert identifies some code as malicious, a signature of the malicious code does not enter the signatures database. Unless a signature is available in the database, instances of the malicious code cannot be detected without human intervention.

Thus, the presently available solutions are not able to detect the malicious code until at least some instances of the malicious code has been successfully inserted and circulated. The illustrative embodiments recognize that the presently available solutions are therefore not suitable for detecting previously unseen or unfamiliar malicious code.

Furthermore, the database of signatures has to be constantly maintained with all possible signatures of known malicious code. The illustrative embodiments recognize that this upkeep is time intensive and error prone. Furthermore, no matter how rigorous the effort to keep the database of signatures up-to-date, new variations of known malicious code and new malicious code proliferate the data communications at a rate that outpaces the currency of the signatures database most of the time.

The illustrative embodiments used to describe the invention generally address and solve the above-described problems and other problems related to detecting malicious code in data. The illustrative embodiments provide a method for normalizing and detecting inserted malicious code.

The illustrative embodiments are described using data communications with a browser only for simplification and clarity of the description. An embodiment is also usable with other applications that receive data with inserted malicious code in a manner described herein. Furthermore, a malicious script is used as an example of malicious code without implying a limitation thereto. Other forms of code that are usable by an embodiment in a manner described herein are also contemplated within the scope of the illustrative embodiments.

An embodiment detects a script that has been inserted into the information sent to a browser. The inserted script contains content-related data and code-related data. For example, the content-related data in the script depends on the content supplied to the browser by a legitimate server in response to a request from the browser. Some examples of content-related data in a script include, but are not limited to, automated session information, reference to a content or user generated for the purpose of the session, and the like.

The code-related data in the script is data that makes the code of the script function. Some examples of code-related data in a script include, but are not limited to, function calls, variable statements, comparison logic, condition statement, code for an input/output (I/O) operation, code to perform a read or write operation, and the like. Code-related data in a script is also referred to herein as a "construct".

A construct can be generic or specific. For example, all function calls regardless of which functions they call are treated as being the same when an embodiment treats the function call constructs generally. In contrast, all function calls to a specific function are treated as being the same when an embodiment treats function call constructs specifically. In other words, function calls to different functions are similar constructs under the notion of generic constructs, and function calls to different functions are different constructs under the notion of specific constructs.

Whether to treat a construct specifically or generically is dependent upon the code of the malicious script. In some cases, treating a construct as generic or specific is interchangeable within the scope of the embodiments, and in other cases, a determination has to be made whether to treat a construct specifically or generically. In this disclosure, an embodiment's handling of a construct is not described as specific or generic for this reason. Depending upon the implementation of an embodiment, the implementation can choose to handle different constructs specifically or generically according to the malicious script being processed.

The embodiment removes the content-related data from the script leaving the constructs of the script remaining in a skeletal form of the original script. For a construct, e.g., a function call, the embodiment selects an alphanumeric string as a representation, stand-in, or replacement of the construct. The embodiment replaces the construct in the remaining structure of the script with the selected string. For example, when different constructs of the same type are selected specifically, the embodiment replaces each specific construct with a different string. When different constructs of the same type are selected generically, the embodiment replaces each construct of the type with the same string.

The embodiment repeats this selection of constructs, selection of corresponding strings, and the replacement of the constructs with strings for as many instances of as many constructs of as many types as might exist in the detected script. This replacement process of an embodiment normalizes the remaining skeletal structure of the script.

Replacing constructs with embodiment-selected strings removes an important hurdle in malicious code detection. Many malicious codes scramble or change the constructs dynamically so that different instances of the inserted code look different to a presently available detection process but perform the same intended malicious function. By normalizing the constructs according to an embodiment, regardless of how the malicious code was shape-shifted or changed dynamically, different instances of the malicious code will normalize to approximately the same normalized form.

Once a suspect script has been normalized, an embodiment compares normalized patterns from the normalized skeletal script with other normalized patterns in a corpus of normalized patterns. The corpus is maintained and supplemented over time. If the normalized pattern from the suspect script matches a normalized pattern in the corpus within a tolerance, an embodiment regards the suspect script as an instance of the malicious code represented by the normalized pattern in the corpus.

Once an embodiment has established that the suspect script is a malicious script, the embodiment generates classification metadata to classify the malicious script for future use. The classification metadata includes, but is not limited to, some combination of a name, source, normalized pattern, and type of the malicious script. The classification metadata can then be stored in a service or repository in a manner similar to a signatures database.

An embodiment uses the normalization process described herein in conjunction with other methods of identifying malicious code. For example, one embodiment attempts to match a pattern in the detected script with a pattern or a regular expression. The pre-matching can be performed before, after, or simultaneously with the script normalization. This pre-matching is helpful in ascertaining the identity of the malicious script when the malicious script has been previously detected.

Another embodiment attempts to match a source of the detected script with a source in a source list, such as a blacklist of servers. The pre-matching can be performed before, after, or simultaneously with the script normalization. This pre-matching is helpful in establishing or confirming the maliciousness of the script when the source has previously been known to insert malicious code.

Another embodiment determines a behavior of the malicious script. For example, the embodiment determines whether the script writes particular data, uses a particular location of memory, causes an operation or event to occur at certain times or intervals, creates or prevents certain transmissions or operations, changes data in an environment, and the like. The embodiment attempts to match, within a threshold, the behavior of the detected script with a behavior of known malicious scripts, such as by using a service or repository of such behaviors. The pre-matching can be performed before, after, or simultaneously with the script normalization. This matching is helpful in ascertaining the identity of the malicious script when the malicious activity has been previously detected but the malicious script is a previously unseen manifestation of the other malicious code.

In some cases, the behavior of a detected script does not match a previously known behavior but the behavior is still suspect, such as for being statistically unusual for the given information exchange. An embodiment performs statistical analysis of a behavior of the detected script to determine a statistical fit of the behavior in a given context of the data in the browser, session, and the like. Any suitable statistical analysis can be used for this statistical matching. If, statistically, the behavior of the detected script can be regarded as malicious, the embodiment classifies the script as malicious.

In some cases, the detected script may be obfuscated. For example, the script itself, although inserted, may not perform the malicious activity, may not be comprehensible, or may not be adequate for performing a malicious function. For example, the obfuscated script may call a server function at runtime to load another script that was not present in the data of the browser when the obfuscated script was detected. In such cases, an embodiment detects the obfuscated script, executes the script to uncover or de-obfuscate the actual script, and perform the normalization, matching, pre-matching, or a combination thereof, on the actual script.

A method of an embodiment described herein, when implemented to execute on a device or data processing system, comprises substantial advancement of the functionality of that device or data processing system in detecting malicious code insertions. For example, in order to detect an inserted malicious code, the prior-art requires patterns of the code to match known signature patterns from a repository. In contrast, an embodiment removes the content-related portions of the inserted code and normalizes the constructs present in the inserted code. An embodiment uses the normalized form of the skeletal structure of the inserted code to detect whether the code is malicious. Such manner of normalizing the inserted code, which overcomes the masquerading, scrambling, and dynamically changing nature of malicious code to aid in the detection of the malicious code, is unavailable in presently available devices or data processing systems. Thus, a substantial advancement of such devices or data processing systems by executing a method of an embodiment facilitates the detection of inserted malicious code even when the malicious code has not previously been seen.

The illustrative embodiments are described with respect to certain code, script, content, applications, patterns, strings, constructs, normalizing, behaviors, analyses, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
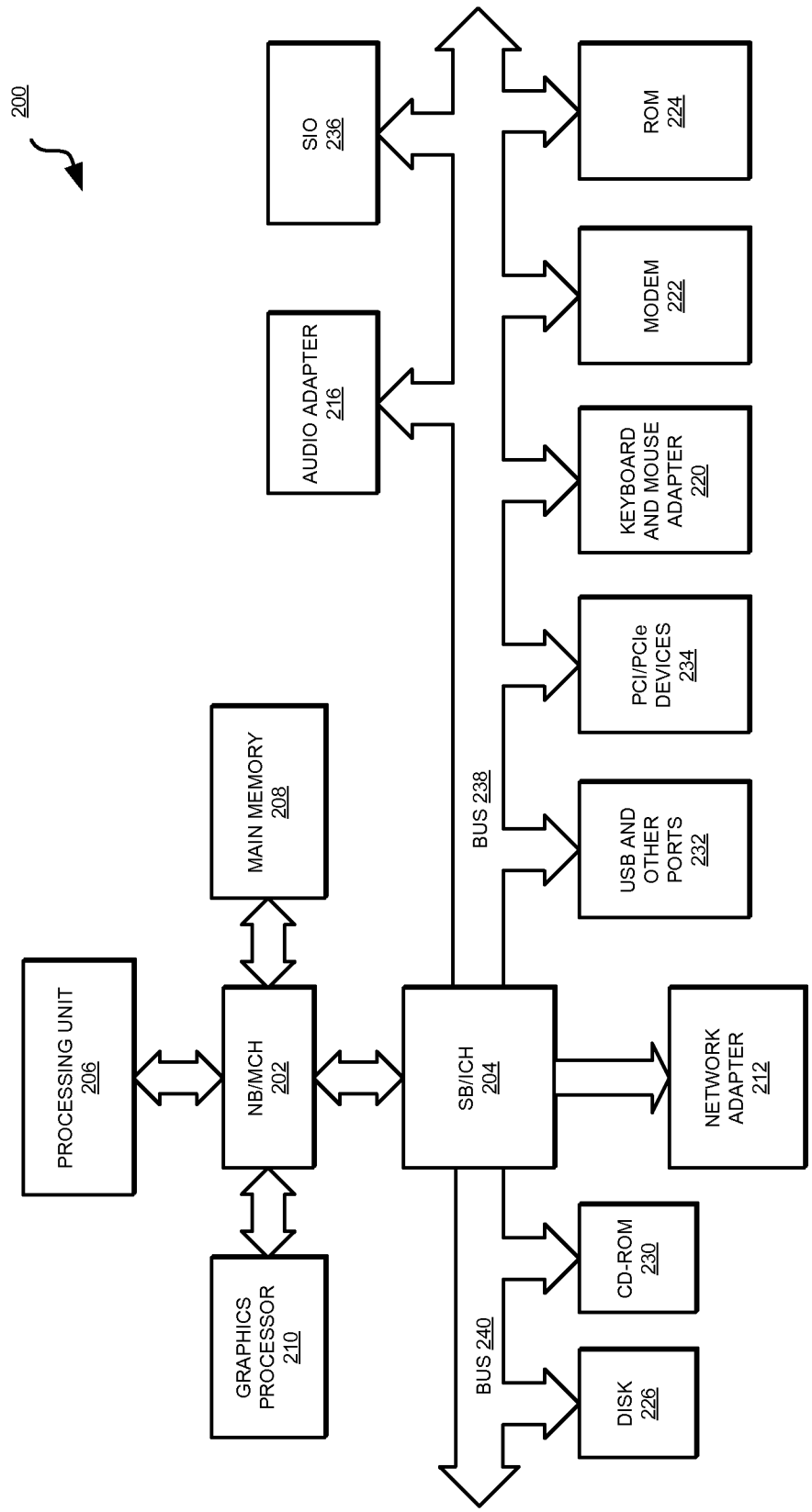
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Application 113 implements an embodiment described herein and operates in conjunction with example browser 111 to detect malicious code that has been inserted into the data used by browser 111. Patterns 109A comprise prior-art signatures, regular expressions and the like. Service 107 provides information about the source from which the inserted code originates, information about known malware, or a combination thereof. Corpus 105 is a collection of normalized patterns against which application 113 compares a normalized pattern from the inserted code.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 113 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
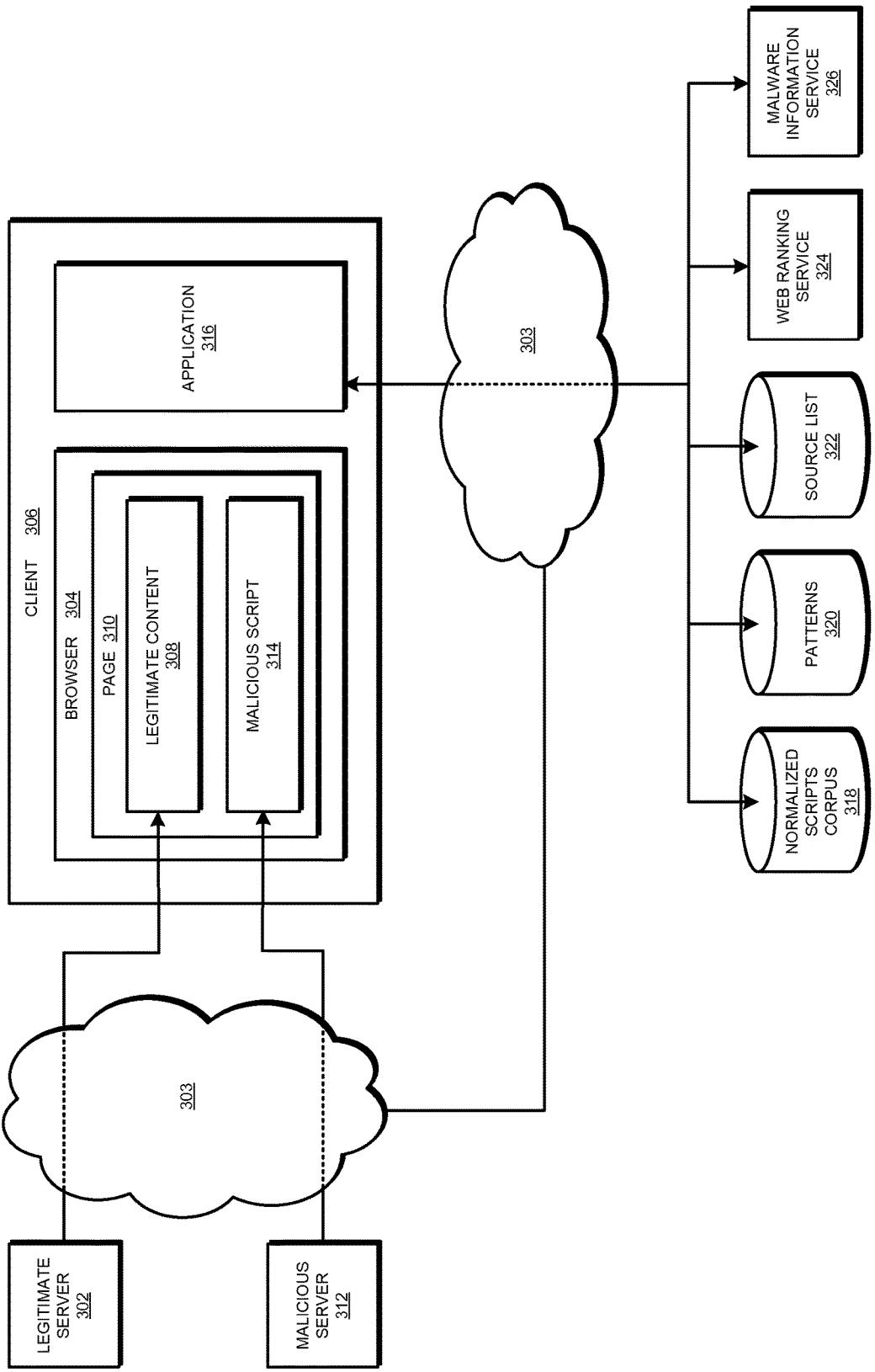
FIG. 3 depicts a block diagram of an example configuration in which malicious code insertions can be detected in accordance with an illustrative embodiment.

With reference to FIG. 3, this figure depicts a block diagram of an example configuration in which malicious code insertions can be detected in accordance with an illustrative embodiment. Legitimate server 302 is a server that provides the content-code mix according to a request browser 304 in client 306 over network 303. Browser 304 is an example of browser 111 in FIG. 1, and can be any suitable application, which can receive data that has been infected with malicious code.

Legitimate content 308 in page 310 in browser 304 results from the content-code mix supplied by server 302. Malicious server 312 inserts malicious script 314 in page 310.

Application 316 is an example of application 113 in FIG. 1. Application 316 implements an embodiment for normalizing and detecting inserted malicious code as described herein. Application detects malicious script 314 using corpus 318 of normalized patterns. In conjunction with the normalization process described in this disclosure, application 316 can optionally use some combination of other prior-art methods to establish, confirm, or reinforce the detection of malicious script 314. For example, application 316 can additionally access, over network 303, repository 320 of patterns or signatures to match code portions of malicious script 314, list 322 of known malicious sources to check whether server 312 is a known malicious server, service 324 to determine a ranking or known behavior of server 312, and service 326 to receive information about known malware for behavioral analysis of malicious script 314.

Figure 4:
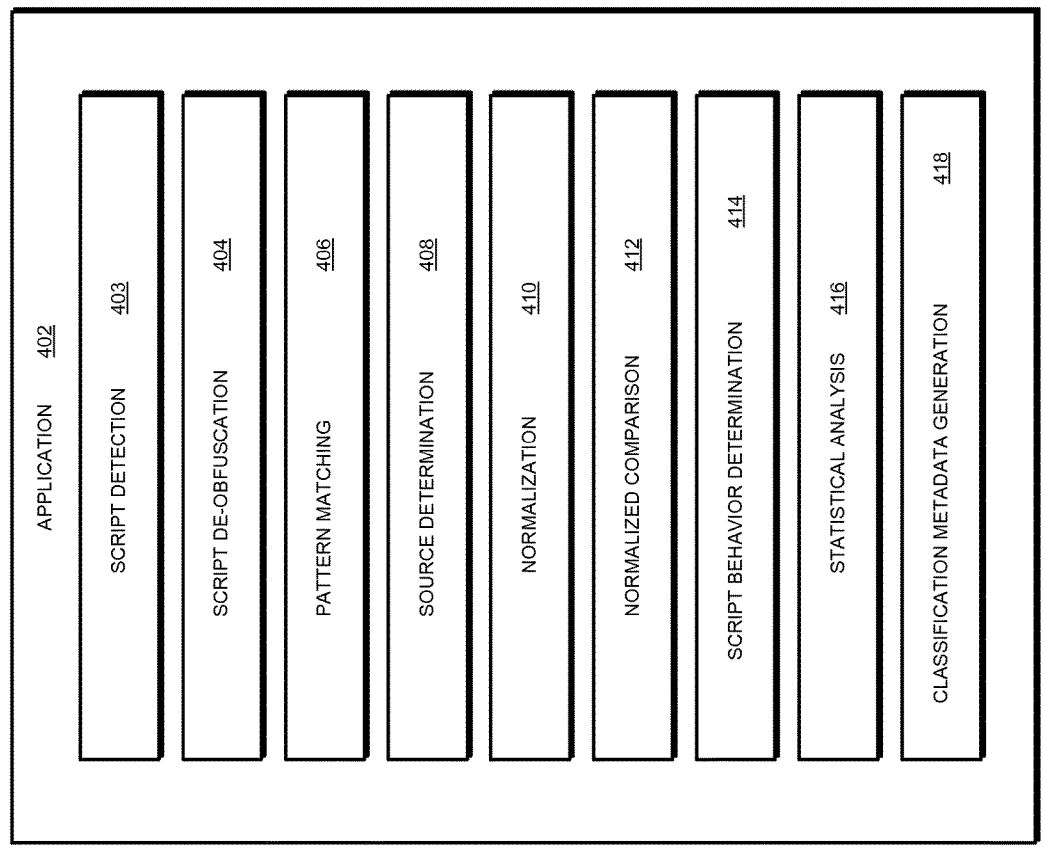
FIG. 4 depicts a block diagram of an example application configured for normalizing and detecting inserted malicious code in accordance with an illustrative embodiment.

With reference to FIG. 4, this figure depicts a block diagram of an example application configured for normalizing and detecting inserted malicious code in accordance with an illustrative embodiment. Application 402 is an example of application 316 in FIG. 3.

Component 403 detects that a script has been inserted in the data of a browser, such as script 314 in page 310 of browser 304 in FIG. 3. If the script is obfuscated, component 404 performs de-obfuscation of the script. For example, component 404 executes the obfuscated script to obtain the actual script whose malicious nature is to be determined. Other components of application 402 then use the actual script for their respective functions as described herein.

The operations of component 406 are optional. If a prior-art signature matching is desired or likely to be useful, component 406 performs the pattern matching between a code portion of the script and a signature in a repository. For example, in some instances, checking for known malware by such signature matching prior to expending computing resources in the normalization operations might be beneficial or desirable. In other instances, checking for known malware by such signature matching after, or simultaneously with the normalization operations might be beneficial or desirable for validating the detection.

If a prior-art source blacklist matching is desired or likely to be useful, component 408 determines the source of the script, e.g., server 312 in FIG. 3, and checks whether the source is a known inserter of malicious code. As with signature matching, in some instances, checking whether the detected script comes from a known malware source might be beneficial or desirable prior to, after, or simultaneously with the normalization operations. The operations of component 408 are optional.

Component 410 performs the normalization operation described elsewhere in this disclosure. For example, component 410 removes the content-related portions of the script, reducing the script to a structure containing only the code constructs. Component 410 replaces the constructs with selected corresponding alphanumeric strings, thus normalizing the code constructs of the script.

For example, a function call construct is replaced with the string "a", a Var statement is replaced with the string "b", and a binary comparison statement is replaced with the string "c". Thus, if the script was inserted with dynamically changing code, its structure would still be identifiable and matched with other versions of the changed code. For example, if the construct of a function call changed from script insertion o script insertion, e.g., being "hasdjhyweuhdb( )" in one instance of the script and being "82374hdkjjhs9ho( )" in another instance of the script, based on the function call's location in the skeletal structure and how they are called in the script, both variations of the same function call will be normalized to "a( )", thereby allowing an embodiment to compare the normalized form in a corpus of normalized scripts.

Component 412 compares all or a part of the normalized script with all or a part of another normalized script in a corpus, such as in corpus 318 in FIG. 3 or corpus 105 in FIG. 1. For example, component 412 can compare whether a portion of the structure of the normalized script, such as the order and form of appearance of certain normalized constructs in the normalized script, matches a comparable portion of another normalized script in the corpus within a specified tolerance or threshold.

Component 414 determines how the script behaves. Some example behaviors of example inserted malicious code are described elsewhere in this disclosure. Component 414 operates to determine those example behaviors and other behaviors exhibited by code in general to characterize the behavior of the script. Component 414 matches the behavior of the script, within a tolerance, with known behaviors of known malicious code, such as by using a repository or service that provides information of such comparable behaviors. Note that the operations of component 414 are optional and may be used in combination with the operations of components 410 and 412 for additional benefits in some instances as described with respect to the operations of components 406 and 408.

Component 416 performs a statistical analysis on the behavior of the script as described elsewhere in this disclosure. The operations of component 416 are optional, and can be used in combination with the operations of components 410 and 412 for additional benefits as described with respect to the operations of components 406 and 408.

If one or more operations of components 406, 408, 410, 412, 414, and 416 result in identifying the script as malicious, component 418 generates the classification metadata for the script to classify the script as malicious. Some example classification metadata is described in this disclosure, and other similarly purposed contents of the classification metadata are contemplated within the scope of the illustrative embodiments.

Component 418 can be configured to send the normalized script or portions thereof, the behavioral information, the classification metadata, or a combination thereof, to one or more repositories or services for aiding future detection of other manifestations of the script. Sometimes, preventing the execution of the malicious script on a machine is counterproductive in that the stopping reveals the structure and functioning of the infected system to the operators of the malicious script. Thus, in one embodiment, optionally, component 418 is further configured to report the detected script for further action.

Figure 5:
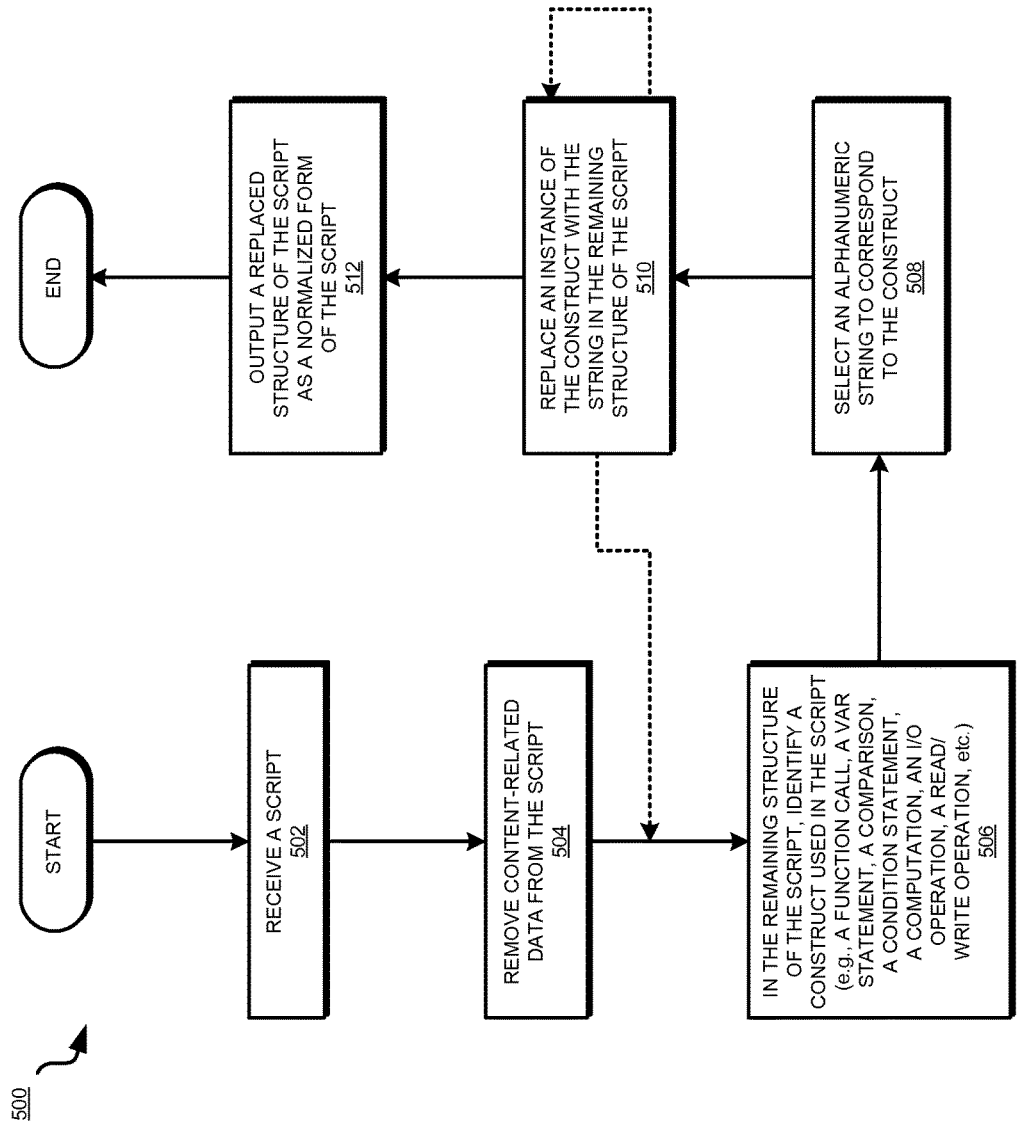
FIG. 5 depicts a flowchart of an example process of normalizing an inserted script in accordance with an illustrative embodiment.

With reference to FIG. 5, this figure depicts a flowchart of an example process of normalizing an inserted script in accordance with an illustrative embodiment. Process 500 can be implemented in component 410 in FIG. 4.

The component receives a detected script (block 502). The component removes the content-related data from the script (block 504).

In the remaining structure of the script, the component identifies a construct used in the script (block 506). The component selects an alphanumeric string to correspond with the identified construct (block 508). The component can be configured to use a string from a set of pre-selected strings, select a string arbitrarily, or a combination thereof.

The component replaces the instance of the construct with the selected string in the remaining structure of the script (block 510). The component repeats block 510 for as many instances of the constructs as may appear in the remaining structure. The component returns process 500 to block 506 to identify additional constructs, if any, in the remaining structure of the script, and repeats blocks 506, 508, and 510 as described above, for such additional constructs.

When no more constructs remain for replacement in the remaining structure of the script, the component outputs a replaced structure in which all the constructs have been replaced with strings for normalization (block 512). The component ends process 500 thereafter.

Figure 6:
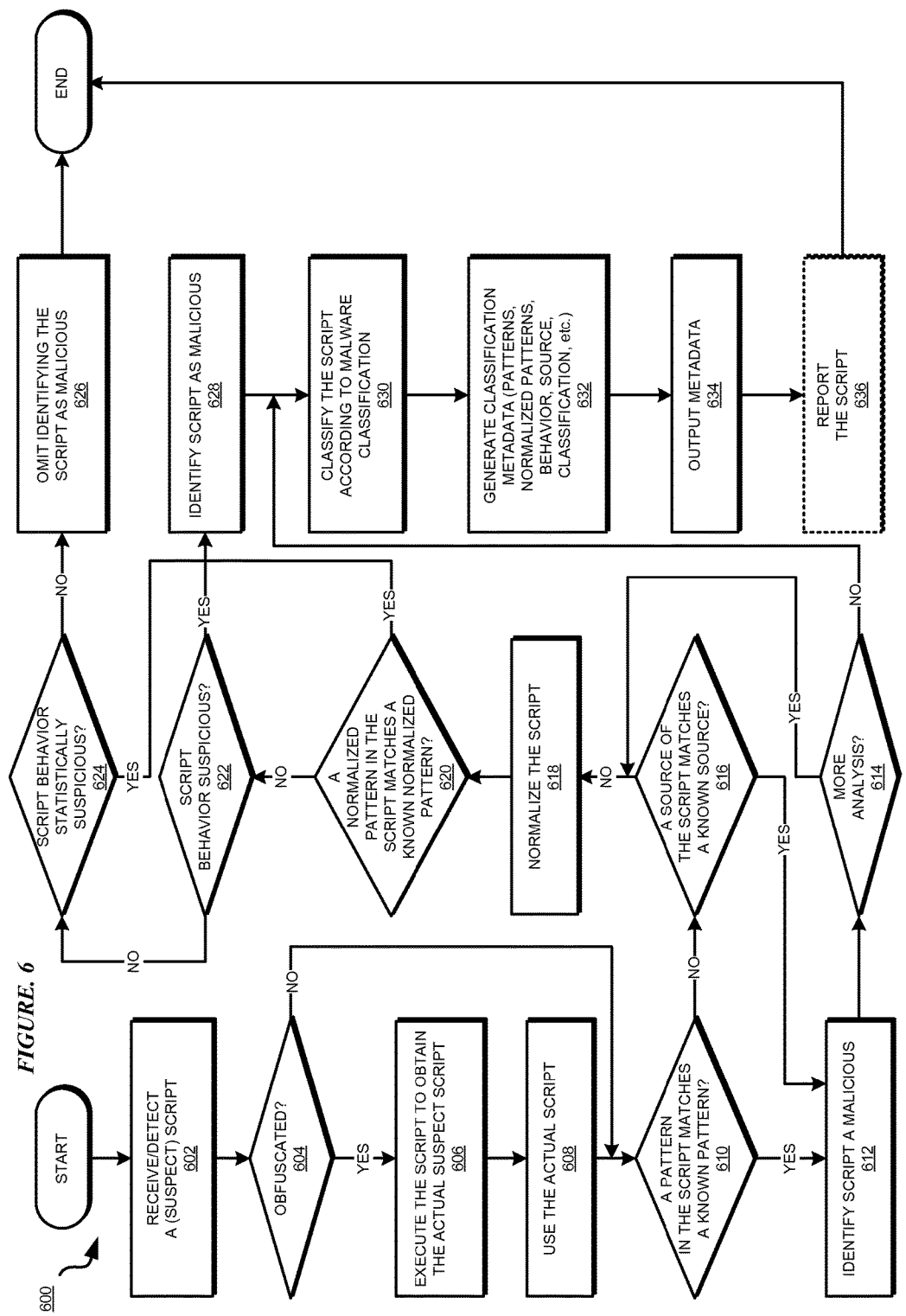
FIG. 6 depicts a flowchart of an example process for normalizing and detecting inserted malicious code in accordance with an illustrative embodiment.

With reference to FIG. 6, this figure depicts a flowchart of an example process for normalizing and detecting inserted malicious code in accordance with an illustrative embodiment. Process 600 can be implemented in application 402 in FIG. 4. Process 600 is illustrated and described with several optional operations described herein. Those of ordinary skill in the art will be able to modify process 600 to remove an option operation, relocate an option operation elsewhere in process 600, or replace or modify an optional operation in process 600 without departing the scope of the illustrative embodiments.

The application receives or detects a suspect script (block 602). The application determines whether the script is obfuscated (block 604). If the script is obfuscated ("Yes" path of block 604), the application executes the script to obtain the actual script (block 606). The application uses the actual script as the suspect script for the remainder of process 600 (block 608). If the script is not obfuscated ("No" path of block 604), the application proceeds to block 610.

The application optionally determines whether a pattern in the script matches a known pattern, e.g., a signature of a known malicious code (block 610). If a pattern in the script matches a known pattern within a tolerance ("Yes" path of block 610), the application identifies the script as malicious (block 612). If a pattern in the script does not match a known pattern within the tolerance ("No" path of block 610), the application proceeds to block 616.

The application determines if further analysis of the script for determining or ascertaining the scripts malicious nature is needed (block 614). If more analysis is needed ("Yes" path of block 614), the application proceeds to block 618. If more analysis is not needed ("No" path of block 614), the application proceeds to block 630.

The application optionally determines if a source of the script matches a source known for inserting malicious scripts (block 616). If the source of the script matches, within a tolerance, a source known for inserting malicious scripts ("Yes" path of block 616), the application identifies the script as malicious at block 612. If the source of the script does not match within the tolerance a source known for inserting malicious scripts ("No" path of block 616), the application normalizes the script (block 618).

The application determines whether a normalized pattern in the normalized script matches a known normalized pattern within a tolerance, such as in a corpus of normalized scripts (block 620). If a normalized pattern in the normalized script matches a known normalized pattern within the tolerance ("Yes" path of block 620), the application proceeds to block 628.

If a normalized pattern in the normalized script does not match a known normalized pattern within the tolerance ("No" path of block 620), the application optionally determines whether a behavior of the script is suspicious, such as by comparing the script's behavior with known malicious behaviors from a repository (block 622). If a behavior of the script is suspicious ("Yes" path of block 622), the application proceeds to block 628.

If a behavior of the script is not suspicious ("No" path of block 622), the application optionally determines whether the script's behavior is statistically suspicious (block 624). If the script's behavior is statistically suspicious ("Yes" path of block 624), the application proceeds to block 628.

If the script's behavior is not statistically suspicious ("No" path of block 624), the application omits identifying the script as malicious (block 626). The application ends process 600 thereafter.

Proceeding from the "Yes" paths of block 620, 622, or 624, the application identifies the script as malicious (block 628). The application classifies the script as malicious according to a classification specification to classify malicious code (block 630).

The application generates the classification metadata for the script (block 632). The application outputs the classification metadata (block 634). Optionally, the application reports the script for further action (block 636). The application ends process 600 thereafter.

Thus, a computer implemented method is provided in the illustrative embodiments for normalizing and detecting inserted malicious code. Where an embodiment or a portion thereof is described with respect to a type of device, the system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for detecting malicious code insertion in data, the method comprising:
    detecting, at an application executing using a processor and a memory in a data processing system, a script that has been inserted in a mix of code and content;
    removing, to form a remaining script structure, from the script a content-related portion, the content-related portion referring to the content in the mix;
    selecting, from the remaining script structure, a code construct, wherein the code construct comprises a function call, and wherein the function call comprises any call to any function in the remaining script structure;
    replacing, to form a normalized construct, the code construct with an alphanumeric string;
    determining whether the normalized construct matches, within a tolerance, a second normalized construct in a corpus of normalized scripts; and
    concluding, responsive to the normalized construct matching the second normalized construct within the tolerance, that the script is malicious.

2. The method of claim 1, further comprising:
    determining whether the script is obfuscated;
    executing, responsive to the script being obfuscated, the script to obtain an actual script; and
    replacing the script with the actual script.

3. The method of claim 1, further comprising:
    identifying a behavior of the remaining script structure, wherein the behavior comprises an operation performed by the code construct one of (i) occurs at a particular time, (ii) occurs at a particular location in the data processing system, (iii) causes an event in the data processing system, and (iv) prevents another operation in the data processing system;
    determining whether the behavior matches within a second tolerance, a known behavior of a malicious code; and
    affirming, responsive to the behavior matching the known behavior of the malicious code within the second tolerance, the concluding that the script is malicious.

4. The method of claim 1, further comprising:
    identifying a behavior of the remaining script structure, wherein the behavior comprises an operation performed by the code construct one of (i) occurs at a particular time, (ii) occurs at a particular location in the data processing system, (iii) causes an event in the data processing system, and (iv) prevents another operation in the data processing system;
    performing a statistical analysis on the behavior to determine whether the behavior is statistically suspicious relative to the mix; and
    affirming, responsive to the behavior being statistically suspicious, the concluding that the script is malicious.

5. The method of claim 1, further comprising:
    generating classification metadata for the script, where the classification metadata comprises a combination of (i) the normalized construct and (ii) a behavior of the remaining script structure; and
    adding in the classification metadata a classification code according to a classification specification, wherein the classification code corresponds to a type of malicious nature of the script.

6. The method of claim 1, further comprising:
    selecting the alphanumeric string from a set of predefined alphanumeric strings; and
    associating the alphanumeric string with the code construct.

7. The method of claim 1, wherein the code construct takes a first form in a first instance of the script and a second form in a second instance of the script, and wherein the detecting detects the first instance of the script.

8. The method of claim 1, further comprising:
    repeating the replacing for all instances of the code construct in the remaining script structure.

9. The method of claim 1, further comprising:
    selecting, from the remaining script structure, a second code construct; and
    replacing all instances of the second code construct with a second alphanumeric string.

10. The method of claim 1, where the function call comprises a call to a specific function.

* * * * *